3,185,542
PRODUCTION OF THE FLUORINATED COMPOUNDS, NO₂F AND THE HF ADDUCT THEREOF
Anthony W. Yodis, Whippany, N.J., assignor to Allied Chemical Corporation, New York, N.Y., a corporation of New York
No Drawing. Filed Dec. 23, 1960, Ser. No. 77,806
10 Claims. (Cl. 23—14)

This invention relates to nitryl fluoride-hydrogen fluoride complexes, processes for making the same, and more particularly to manufacture of nitryl fluoride.

Nitryl fluoride, NO₂F, B.P. minus 72.4° C., M.P. minus 166° C., has been prepared by spontaneous combustion of NO in an atmosphere of elemental fluorine, by mixing NO₂ with elemental fluorine, and by reacting sodium nitrite with elemental fluorine. Such methods are not readily adapted for commercial development chiefly because use of elemental fluorine is always undesirable if avoidable.

A major object of the invention is to provide processes for making nitryl fluoride without the use of elemental fluorine. Another object is to provide for manufacture of nitryl fluoride from nitryl chloride and anhydrous hydrogen fluoride. The latter is a commonly employed fluorinating agent, and both raw materials are readily available at low cost. Other objectives include provision of processes for making a certain nitryl fluoride-hydrogen fluoride complex which serves as highly satisfactory intermediate for production of nitryl fluoride. Another important object is to afford a procedure by which it is possible conveniently to recover for reuse an agent employed to dehydrofluorinate the complex, and also to recover substantially all of the hydrogen fluoride constituent of the intermediate nitryl fluoride-hydrogen fluoride complex.

In accordance with the invention, it has been found that nitryl chloride and hydrogen fluoride may be reacted readily, under anhydrous conditions, with or without catalysts, to form nitryl fluoride complexed with hydrogen fluoride. Also, it has been found that such complex may be readily dehydrofluorinated, thereby breaking up the complex to liberate vaporous nitryl fluoride as a recoverable sought-for product, and to form a residual compound which contains the hydrogen fluoride component of the NO₂F complex and from which residual compound such hydrogen fluoride may be readily stripped out and returned for reuse in the initial reaction with fresh incoming nitryl chloride. NO₂Cl is a known compound which can be readily prepared e.g. from nitric acid and chlorosulfonic acid, and which has a boiling point of about minus 17° C. and a melting point of about minus 145° C.

Procedurally, the invention involves reacting nitryl chloride and hydrogen fluoride under anhydrous conditions, to form nitryl fluoride-hydrogen fluoride complex, technique being such as to provide preferably for recovery of the complex as liquid, and in any case to separate the complex from by-product HCl. When nitryl fluoride itself is the ultimate sought-for product, in accordance with the invention the nitryl fluoride-hydrogen fluoride complex is dehydrofluorinated by subjecting the same to the action of suitable alkali metal fluoride which functions to remove the hydrogen fluoride component from the complex to liberate nitryl fluoride as a recoverable vapor and to form a residual alkali metal fluoride salt which contains the hydrogen fluoride extracted from the complex. When practicing the invention as a continuous cyclic process, the residual alkali metal salt HF content which had been acquired from the complex is separated out, such HF is returned for reaction with fresh incoming nitryl chloride, and the alkali metal fluoride reconstituted to its original form is returned for further use in the dehydrofluorinating stage. Hence, practice of the invention, as a whole and as an integrated cyclic process for production of NO₂F from NO₂Cl and anhydrous HF, comprises in a first phase subjecting NO₂Cl, under anhydrous conditions and at reactive temperature, to the action of HF in quantity sufficient to form a complex of NO₂F and HF, and recovering the complex free of by-product HCl and preferably as a liquid; in a second phase, dehydrofluorinating the complexed material by subjecting the same to the action of an alkali metal fluoride in quantity sufficient to react and combine with substantially all of the HF component of the complex material and thereby liberate NO₂F in recoverable vapor form; and in a third phase, subjecting residual acid alkali metal fluoride compound, containing HF abstracted from the complex, to hereindescribed treatment to decompose the same back to hydrogen fluoride and alkali metal fluoride in its initial form, the latter being reuseable as dehydrofluorinating agent, and the former as NO₂Cl fluorinating agent.

In accordance with the invention, it hs been found that nitryl fluoride and HF form a complex which corresponds closely to NO₂F.5HF. This material is a relatively stable, water-white liquid, and can be distilled at atmospheric pressure. The NO₂F.5HF boils at 62° C. at atmospheric pressure without decomposition, and melts below minus 78° C. The complex is a clear liquid which fumes on exposure to moist air and hydrolyzes to mixtures of HF and nitric acid. The complex is particularly useful as an intermediate for production of nitryl fluoride as in accordance with this invention.

In practice of major phases of the invention, reactions of NO₂Cl and HF to form the complex appear to be summarizable as (1) 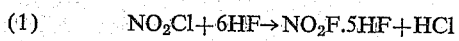 NO₂Cl+6HF→NO₂F.5HF+HCl and when utilizing for example KF.HF as dehydrofluorinating agent, reactions appear to be represented by (2)  NO₂F.5HF+5KF.HF→NO₂F+5KF.2HF Reaction of nitryl chloride and anhydrous hydrogen fluoride to form the complex may be carried out in either liquid or gas phase, and either batchwise or continuous.

Temperatures utilized to effect reactions of NO₂Cl and anhydrous HF may vary over a wide range, particular temperatures being dependent on such factors as whether the reaction is carried out in gas or liquid phase, batchwise or continuous, with or without reduced or superatmospheric pressure.

Low temperature limit is mostly a matter of convenience and economy. Liquid phase reactions at least in the early stages may be carried out at temperatures which are relatively low. Temperatures below about minus 25° C. serve no useful purpose, and no particular advantage is apparent by use of temperatures lower than about the minus 17° C. boiling point of NO₂Cl.

At ordinary temperatures, nitryl chloride is available as a colorless to pale yellow gas. Thus, gas phase reactions may be advantageous. Temperatures of gas phase reactions are such as to maintain all materials in the reaction zone substantially in gas phase, but below temperatures at which decomposition of NO₂Cl to NO₂+Cl₂ is initiated. About 100° C. (atmospheric pressure) is a practicable preferred maximum reaction temperature.

Mol ratios of HF to NO₂Cl which may be employed may be varied within moderate limits with regard to all embodiments of the invention. In both reactions such ratios refer to ultimate ratio of total incoming reactants charged, and in the case of continuous reactions, such ratios of incoming reactants apply to the continuous feed composition. Mol ratio of HF to nitrosyl chloride may lie in the range of 2:1 to about 10:1. Upper limit of HF is mostly a matter of convenience and economy since high ratios of HF necessitate recovery and recycling of larger quantities of HF. Conversely, low HF ratios result in large amounts of unreacted nitryl chloride, and require recovery of relatively large amounts of $NO_2Cl$ by distillation and recycle. More suitable $HF:NO_2Cl$ ratios lie in the range of about 3:1 to 9:1, preferred ratios being in the range of 5–6:1.

For batch liquid phase procedure, typical apparatus may comprise an insulated pot-type reactor or still, equipped with a packed column having sufficient plates to facilitate good separation of successive components to be drawn off; means for added heat input; suitable inlet ports for introduction of $NO_2Cl$ and HF either as gases or chilled liquids; and a condenser, superjacent the column, having a vent and associated refluxing provisions to return a portion or all condensate back down the column. The condenser may be cooled to about minus 78° C. by a Dry Ice-acetone mixture.

In a representative type of batch operation in which the total of one of the reactants is charged into the reactor and the other reactant is gradually added, reaction starts immediately on introduction of the initial increments of the second reactant, and HCl is evolved. The minus 78° C. temperature maintained in the condenser permits venting of HCl, but at the same time effects refluxing and return to the reactor of all other materials which vaporize. HF and $NO_2Cl$ may be charged in mol ratio of say 5.5:1. On charging of reactants, pot temperature automatically goes to about minus 17° C. (B.P. of $NO_2Cl$) as pot contents boil. During reaction, when HCl is venting, the still is operated on total reflux, the liquid condensed being largely $NO_2Cl$, the most volatile constituent. Ultimate yield of end product is dependent largely on reaction time—i.e. time of total refluxing subsequent to completion of charging of both reactants—which may vary considerably. Approaching end point of reaction is denoted by very slow or substantial cessation of evolution of HCl. However, economic considerations may indicate desirability of shortening reaction time notwithstanding decreased yield. Hence, reaction time (total refluxing) may lie in the range of 2–8 hours or higher depending upon particular circumstances at hand, and for any given apparatus equipment optimum reaction time may be determined by test run. During the course of the reaction, pot temperature in the still may vary considerably depending upon the degree of reaction which has taken place. As indicated, at the outset of reaction, pot temperature is about minus 17° C. Assuming almost complete reaction (pot contents only $NO_2F.5HF$ and excess HF), pot boiling point might rise to say plus 45–50° C. An intermediate degree of reaction brings boiling point of pot material to a corresponding intermediate temperature. In most operations, refluxing time and degree of reaction are such that reaction temperature in the pot is in the range of minus 17° C. up to about zero degrees C.

On completion of reaction to the desired extent, the condenser and reflux may be put on partial reflux and partial take-off of condenser liquids, and extraneous heat may be applied to the pot as needed, all in conventional manner so as to successively separate out of the reaction mass in the pot any dissolved HCl, then unreacted $NO_2Cl$ (B.P. minus 17° C.), and then unreacted HF (B.P. plus 19.5° C.). Pot residue is the sought-for $NO_2F.5HF$ product which may be recovered either as a relatively crude liquid still bottom, or as a more purified product which may be obtained by redistillation of the still bottom. The $NO_2F.5HF$ product is a colorless liquid boiling at 62° C. without decomposition; is stable at temperatures at least as high as 300° C., and melts below minus 78° C.

Liquid phase reaction may be practiced continuously in apparatus comprising a reactor topped by a column and a superjacent total condensor equipped with a vent to release HCl, and a rectification still connected to the reactor pot. Recycle and fresh incoming $NO_2Cl$ and HF may be continuously metered into the reactor pot maintained under total reflux and supplied with enough heat if needed to hold contents of the pot to compositions boiling in the range of say minus 17 to minus 10° C., e.g. compositions representing around 50% reacted. Pot liquor may be continuously drawn off and fed into the lower section of the column of the rectification still which may be constructed and operated so as to take off unreacted HF from a point higher up on the column, and unreacted $NO_2Cl$ at the condenser, leaving $NO_2F.5HF$ as a crude still bottom which may be redistilled for further purification.

Continuous gas-phase reaction of $NO_2Cl$ and HF may be employed. In this modification, nitryl chloride and hydrogen fluoride both in gas form may be passed into a preferably unpacked reactor which may be tubular, made of e.g. nickel or nickel alloy, and mounted in an electrically heated furnace. The exit of the reactor may be connected to the base of a vertically disposed still made of nickel, packed if desired, and equipped at the head with a reflux condenser cooled to about minus 78° C. by means of Dry Ice-acetone mixture. In operation, by-product HCl is continuously vented thru the reflux, while all other materials exiting the reactor, including the $NO_2F.5HF$ complex and unreacted $NO_2Cl$ and HF, are trapped in the still in the liquid form. By means of suitable facilities, liquor collecting as still bottoms may be continuously drawn off and handled as previously described to separate out any unreacted HF and $NO_2Cl$ and recover the $NO_2F.5HF$.

Reaction conditions in the reactor should be such as to maintain all therein materials in the gas phase during residence in the reactor. Contact time may be in the range of 1–100 seconds, optimum being determinable by test run. Where inert diluent gases, such as nitrogen and $CO_2$, are employed, temperatures in the reactor may be as low as say 20° C. However, since use of diluent gases affords no substantial advantages, it is preferred to carry out the reaction in the absence of diluent gases in which instance higher reaction temperatures are maintained. At atmospheric pressures, gas phase reaction may be conveniently carried out at temperatures in the range of about 30° C. up to a temperature a workably few degrees below the approximately 120° C. decomposition temperature of $NO_2Cl$. In the better embodiments of gas phase operation, temperatures are maintained just high enough to keep incoming reactants and reaction products substantially in the gas phase during reactor residence, e.g. in the range of about 30–100° C. at atmospheric pressure.

The nature of all forms of the reaction of $NO_2Cl$ and HF is such as to permit use of atmospheric pressure. However, reduced or superatmospheric pressures may be employed in either liquid or gas phase reactions. Although no particular operating advantages is afforded by using reduced pressure, pressures above atmospheric may be used to some advantage. For example, liquid phase reaction may be carried out at a temperature of about 60° C. under a pressure of 200 p.s.i.g., in which instance pressure increases the solubility and concentration of the reactants in the liquid reaction mixture, with a reduction in reaction time, and minimization of refrigeration which may be necessary to maintain the reactants in the liquid phase.

In accordance with the second phase of the invention process, the $NO_2F.5HF$ made as above may be dehydrofluorinated to abstract the HF complexing component of the complex and liberate $NO_2F$ as a recoverable vapor.

The dehydrofluorinating agents are alkali metal fluorides such as NaF, KF and systems represented generally by KF.xHF and NaF.xHF. When utilizing KF.xHF as dehydrofluorinating agent, reactions involved in dehydrofluorination and recovery of KF.xHF and HF may be summarized as (3) $NO_2F.5HF + y(KF.xHF) \longrightarrow NO_2F + yKF.\left(x+\frac{5}{y}\right)HF$ (4) $yKF.\left(x+\frac{5}{y}\right)HF + heat \longrightarrow yKF.xHF + 5HF$ Nitryl fluoride is a powerful oxiding agent and has fluorinating power only a little less than fluorine itself.

Several methods for dehydrofluorinating the complexes may be used. According to one simple batch procedure, pulverized, granular or pelleted sodium fluoride may be added gradually to the liquid complex. While lower temperatures may be employed, preferably this operation is carried out at room temperature, e.g. 20° C., or higher. The reaction is exothermic, and is preferably conducted, as by control of rate of reaction or by applied cooling, so as to maintain temperature sufficiently below the 62° C. boiling point of the $NO_2F.5HF$ complex to avoid appreciable carry-over of the latter in vapor form along with the evolved $NO_2F$. The result is that the sodium fluoride abstracts the HF complexing component of the complex, and $NO_2F$ in vapor form is allowed to distill out of the reaction mass. The $NO_2F$ may be condensed in a Dry Ice-acetone trap and redistilled for greater purity if desired. The HF is abstracted from the liquid complex by combination with sodium fluoride to form the resulting NaF.xHF system which can thereafter be heated to release combined HF and recover sodium fluoride. The HF is then recycled to the first step for further reaction with $NO_2Cl$ and the recovered sodium fluoride is reused to dehydrofluorinate additional $NO_2F.5HF$.

In another suitable method for dehydrofluorinating the $NO_2F.5HF$ complex, the latter may be vaporized and passed thru a tower packed with granulated or pelleted sodium fluoride and maintained at temperature of about 100–150° C., preferably around 105° C. The gas issuing from the packed tower is $NO_2F$ vapor which may be condensed and further purified as above indicated. The NaF reactor may be heated to temperature of 300–400° C. to release the combined HF, thereby reforming NaF which can be reused as a dehydrofluorinating agent. The released HF may be recycled.

The preferred method of dehydrofluorinating the complexes is a procedure in which the $NO_2F.5HF$ complex is continuously fed, with due regard to operating factors such as efficient contacting conditions and residence time, in liquid or gas form into an $NO_2F$ generator containing a liquid potassium fluoride-xHF system maintained in the liquid condition by suitable adjustment of temperature and of the potassium fluoride:HF mol ratio. $NO_2F$ is continuously evolved and discharged from the generator, and the desired KF:HF mol ratio of the liquor in the generator is maintained by continuously withdrawing liquid KF:HF system from the generator, removing some of the HF from the liquid system and continuously returning liquid system of reduced HF content to the generator. In this procedure, the KF.xHF system may be of composition such as to be liquid, i.e. having a melting point, at temperature not higher than about 200° C., the preferred maximum dehydrofluorinating temperature of all embodiments. Preferably, as to composition, the liquid system maintained in the generator has a KF to HF mol ratio of one KF to not substantially less than two HF.

According to one preferred procedure, liquid complex is continuously fed into an $NO_2F$ generator in which there is maintained a liquid KF.xHF system in which the KF:HF ratio is about 1:2, i.e. the "x" of the KF.xHF is 2. Melting point of KF.HF is about 239° C., and compounds in the range of about KF.2HF and KF.3HF have melting points in the range of about 72–65° C.

Thus the KF.2HF system has a melting point of about 72° C., and to increase fluidity, temperature in the generator may be held at about 100° C. $NO_2F$ is continuously evolved in the generator. In this embodiment temperatures above about 100–125° C. may be avoided to minimize vaporization of the incoming complex and thus reduce entrainment of complex material with outgoing $NO_2F$ product. Vapor pressure of HF above the liquid system is not critical since vapor phase HF will combine with the large excess of $NO_2F$ vapor present to form a relatively small amount of $NO_2F.5HF$ complex which leaves the generator in vapor form along with the $NO_2F$. On cooling the $NO_2F$ to say minus 20° C. any entrained $NO_2F.5HF$ complex may be condensed out and returned to the generator. Substantially pure $NO_2F$ may be condensed and recovered as liquid by cooling to e.g. minus 78° C.

In maintaining the desired KF:HF ratio of the liquid in the generator the liquor is continuously withdrawn therefrom and introduced into an HF stripper which, in the present embodiment, may be maintained at a temperature of about 250° C. The HF, abstracted from the complex fed into the generator, is volatilized out of the liquid KF.xHF system while in the stripper and returned to the primary reactor in which $NO_2Cl$ and HF are initially reacted to form the $NO_2F.5HF$ complex. Heating in the stripper may be such as to cut down the HF content of the liquid KF.2HF system to a KF.HF system of about 1:1. Such material has a melting point of about 239° C., at which temperature and composition the stripped liquid system is continuously returned to the $NO_2F$ generator. It will be understood that procedural factors such as particular temperature, rates of feed of complex and of stripped KF.xHF system to the generator, and rate of discharge of high HF liquor from the generator may be easily regulated so as to maintain in the generator a KF.xHF system of the desired composition.

With regard to the KF:HF ratio maintained in the generator, it is preferred to withdraw the liquor at a ratio of about 1:2 or a little higher, say 1:2.2. Higher ratios say of the order of 1:3 may be suitably maintained. However, the amount of HF abstracted by the KF.xHF system is a function of time and the reaction proceeds at a slower rate as the HF content of the liquor in the generator increases. Maintenance of the KF:HF in the generator at about 1:2 or 1:2.2, effects rapid and complete HF extraction from the $NO_2F.5HF$ complex. With a generator liquor ratio of about 1:3, HF abstraction is substantially complete but noticeably slower. With a generator liquor ratio above about 1:4, HF abstraction from incoming complex drops off to undesirable values.

The following illustrate practice of the invention.

*Example 1*

The reactor employed was a nickel pot equipped with a nickel column topped by a condenser and an associated vent, and with suitable inlet tubes for introduction of liquid nitryl chloride and liquid anhydrous hydrogen fluoride. The condenser was cooled to about minus 78° C. by a Dry Ice-acetone bath. About 3.68 mols (300 g.) of liquid $NO_2Cl$ were charged into the reactor. During a period of about 3.5 hrs., about 19.5 mols (390 g.) of liquid anhydrous HF were fed into the reactor. Mol ratio of starting materials charged was about 5.3 mols of HF per mol of $NO_2Cl$. Immediately on introduction of HF, reaction was initiated and continued all during addition of HF. HCl was vented from the condenser while all other materials exiting the reactor were condensed and returned thereto. External temperature conditions of the pot were ambient while throughout the course of addition of the liquid anhydrous HF pot temperature automatically maintained itself at about minus 16° C. On completion of addition of HF, the system (pot, column and condenser) was permitted to warm up to about room temperature to vaporize off some of the unreacted $NO_2Cl$ (B.P. minus 17° C.). The condenser was then cooled down to about minus 10° C. and gentle heating was applied to the pot. During a period of about half an hour, pot temperature varied progressively from about 23° C. to 32° C., and temperature at the head of the column for the most part was held at about 10–13° C. During this interval, dissolved HCl and substantially all the residual unreacted $NO_2Cl$ were driven off. The pot residue, which was a water white strongly fuming liquid, was charged into a conventional rectification still, and during a period of about 4.5 hours, HF was distilled off with column head temperatures in the range of about 19–25° C., and pot temperatures in the range of about 26–60° C. Distillation was continued until the still was just about dry, and there were recovered about 0.364 mols (60 g.) of material boiling at about 62° C. This fraction was analyzed for total fluorine, $NO_2F$, HF and nitrogen, and was identified as a liquid $NO_2F.5HF$ complex.

*Example 2*

Apparatus employed was the same as in Example 1. With the condenser cooled to about minus 78° C., about 30 mols (600 g.) of liquid anhydrous HF were fed into the reactor. Then about 3.55 mols (290 g.) of liquid $NO_2Cl$ were charged over a period of about 3 hrs. Mol ratio of starting materials charged was about 8.4 mols of HF per mol of $NO_2Cl$. Pot temperature dropped to about minus 17° C. shortly after $NO_2Cl$ addition was started. Reaction proceeded as in Example 1, and throughout the course of addition of the liquid $NO_2Cl$, pot temperature maintained itself at about minus 17° C. Subsequent to completion of addition of the $NO_2Cl$, the reactants were allowed to reflux for an additional 2 hrs., during which time pot temperature was about minus 17° C. The condenser was allowed to warm up to about minus 10° C. and gentle heating was applied to the pot. The unreacted $NO_2Cl$ was thus allowed to vaporize off, pot temperature rising to about 30° C. The pot residue, having the same characteristics as in Example 1, was charged into a conventional rectification still, and HF was distilled off with a column head temperature of about 19° C. Thereafter distillation was continued until the still was just about dry, and there were recovered about 1.19 mols (197 g.) of colorless liquid boiling at about 62° C., and identified as in Example 1 as $NO_2F.5HF$. Yield of $NO_25HF$ was about 34% of theory.

*Example 3*

Apparatus employed was a conventional batch rectification still. With the condenser cooled to minus 78° C., about 7 g. of $SbF_5$ as catalyst and about 17.5 mols (350 g.) of liquid anhydrous HF was fed into the still pot. Then about 2.46 mols (200 g.) of liquid $NO_2Cl$ were charged during a 1½ hr. period. Mol ratio of starting materials was about 7.1 mols of HF per mole of $NO_2Cl$. During the $NO_2Cl$ addition, pot temperature maintained itself at about minus 17° C., and HCl was vented past the condenser. On completion of the $NO_2Cl$ addition, the reactants were kept under total reflux for an additional 4¾ hrs., during which time pot temperature rose from minus 17 to about minus 13° C. Column head temperature was minus 17° C. The still was adjusted to partial reflux, and unreacted $NO_2Cl$ was taken off the condenser for reuse, this fraction representing a column head temperature from minus 17° C. to plus 5° C. The fraction from 5° C. to 60° C. (largely HF) was taken off for reuse. Then, the remainder of the material was taken off at 62° C. until the still was dry. This latter material was the water-white $NO_2F.5HF$. Weight of this fraction was 203 grams, representing 1.23 mols of material. Yield of $NO_2F.5HF$ was about 50% of theory.

*Example 4*

Nitryl fluoride was made by dehydrofluorination of liquid $NO_2F.5HF$ complex prepared as in Examples 1 to 3. About 0.151 mol (25 g.) of liquid $NO_2F.5HF$ was introduced into a nickel reactor. The reactor and the $NO_2F.5HF$ contents were chilled down to about minus 78° C. to insure a relatively slow and observable subsequent reaction. About 0.77 mol (60 g.) of solid $KF.HF$ was fed into the reactor, the gas outlet of which was connected to a cold trap maintained at about minus 78° C. by means of a Dry Ice-acetone mixture. The quantity of $KF.HF$ added to the reactor was such as to produce $KF.2HF$ on the basis of complete reaction with the 5HF of the complex. Reaction initiated instantaneously, and colorless liquid was observed in the trap even at the initial low temperature of the reactor and contents. The reactor was heated to about 65° C. to insure maximum transfer of gas to the cold trap. After a total reaction time of about 5 minutes, about 9.8 g. of colorless liquid was collected in the trap. All of the liquid in the trap was boiled out at temperature in the range of minus 74° C. to minus 72° C. Gas density test showed that the vapor had a molecular weight of about 65. Hence, there were recovered about 0.151 mol of substantially pure nitryl fluoride, and yield of $NO_2F$ on the basis of the $NO_2F.5HF$ fed was 100% of theory. Inspection of the reactor after reaction showed that about 50–65 weight percent of the original $KF.HF$ was unreacted, demonstrating that the portion that did react formed at least $KF.3HF$ and probably some $KF.4HF$.

I claim:

1. The process for making nitryl fluoride-hydrogen fluoride complex material which comprises introducing into a reaction zone as sole reactants $NO_2Cl$ and HF, said HF being a reactively effective amount but not substantially in excess of 10 molecular proportions per mol of $NO_2Cl$, reacting said $NO_2Cl$ and HF in said zone, to form a complex of $NO_2F$ and HF, under substantially anhydrous conditions and by maintaining in said zone temperature substantially in the range of minus 25° C. to below temperature of appreciable decomposition of $NO_2Cl$, and recovering from the resulting reaction mass nitryl fluoride-hydrogen fluoride complex material which under substantially normal conditions is a substantially water-white distillable liquid boiling at about 62° C. at atmospheric pressure.

2. The process for making nitryl fluoride-hydrogen fluoride complex material which comprises introducing into a reaction zone as sole reactants $NO_2Cl$ and HF, said HF being in reactively effective amount but not substantially in excess of 10 molecular proportions per mol of $NO_2Cl$, reacting said $NO_2Cl$ and HF in said zone, to form a complex of $NO_2F$ and HF, under substantially anhydrous conditions and by maintaining in said zone temperature substantially in the range of minus 25° C.-plus 100° C., and recovering from the resulting reaction mass nitryl fluoride-hydrogen fluoride complex material which under normal conditions is a substantially water-white distillable liquid boiling at about 62° C. at atmospheric pressure.

3. The process of claim 2 in which $NO_2Cl$ and HF are each introduced into the reaction zone in vaporous form, temperature is maintained substantially in the range of 30–100° C., and the complex material is recovered from the vaporous exit of the reaction zone.

4. The process of claim 2 in which the quantity of HF is sufficient to provide a ratio of $HF:NO_2Cl$ in the range of 2:1 to 10:1.

5. The process of claim 2 in which reaction temperature is above minus 25° C. but low enough to maintain $NO_2Cl$, HF and nitryl fluoride-hydrogen fluoride complex reaction product substantially in liquid phase.

6. The process of claim 2 in which reaction temperature is substantially in the range of minus 30-zero degrees C.

7. The process for making $NO_2F$ involving making nitryl fluoride-hydrogen fluoride complex material which process comprises introducing into a reaction zone as sole reactants $NO_2Cl$ and HF, said HF being a reactively effective amount but not substantially in excess of 10 molecular proportions per mole of $NO_2Cl$, reacting said $NO_2Cl$ and HF in said zone, to form a complex of $NO_2F$ and HF, under substantially anhydrous conditions and by maintaining in said zone temperature substantially in the range of minus 25° C. to below temperature of appreciable decomposition of $NO_2Cl$, recovering from the resulting reaction mass nitryl fluoride-hydrogen fluoride complex material which under normal conditions is a substantially water-white distillable liquid boiling at about 62° C. at atmospheric pressure, dehydrofluorinating such complex material by subjecting the same to the action of alkali metal fluoride to react and combine with HF component of said complex material and thereby liberate $NO_2F$ in vapor form, and recovering $NO_2F$.

8. The process for making $NO_2F$ involving making nitryl fluoride-hydrogen fluoride complex material which process comprises introducing into a reaction zone as sole reactants $NO_2Cl$ and HF, said HF being in reactively effective amount but not substantially in excess of 10 molecular proportions per mol of $NO_2Cl$, reacting said $NO_2Cl$ and HF in said zone, to form a complex of $NO_2F$ and HF, under substantially anhydrous conditions and by maintaining in said zone temperature substantially in the range of minus 25° C.-plus 100° C., recovering from the resulting reaction mass liquid nitryl fluoride-hydrogen fluoride complex material which under normal conditions is a substantially water-white distillable liquid boiling at about 62° C. at atmospheric pressure, introducing the same into a liquor comprising a potassium fluoride-HF system having a melting point not higher than about 200° C., and having a KF:HF mol ratio of one to not less than 2 and heated to temperature high enough to maintain the resulting mass in liquid phase to thereby effect combination of substantially all of the HF component of said complex with HF of said system and liberate $NO_2F$ in vapor form, and recovering said $NO_2F$.

9. The process of claim 8 in which the KF:HF mol ratio is substantially in the range of 1:2 to 1:4.

10. The process of claim 8 in which the temperature of the said liquor system is not more than about 125° C.

References Cited by the Examiner
UNITED STATES PATENTS 3,032,400   5/62   Marsh _____ 23—203

OTHER REFERENCES

Hetherington et al.: "Nitryl Fluoride and Nitronium Compounds," pub. in Recent Aspects of the Inorganic Chemistry, Special Publication No. 10, The Chemical Society (London), 1957, pages 23 to 32.

Price et al.: Journal of the American Chemical Society, vol. 75, July 5, 1953, pages 3276–3277.

Schmeisser et al.: Zeitschrift für Naturforschung, vol. 76, page 583 (1952).

MAURICE A. BRINDISI, *Primary Examiner.*